UNITED STATES PATENT OFFICE.

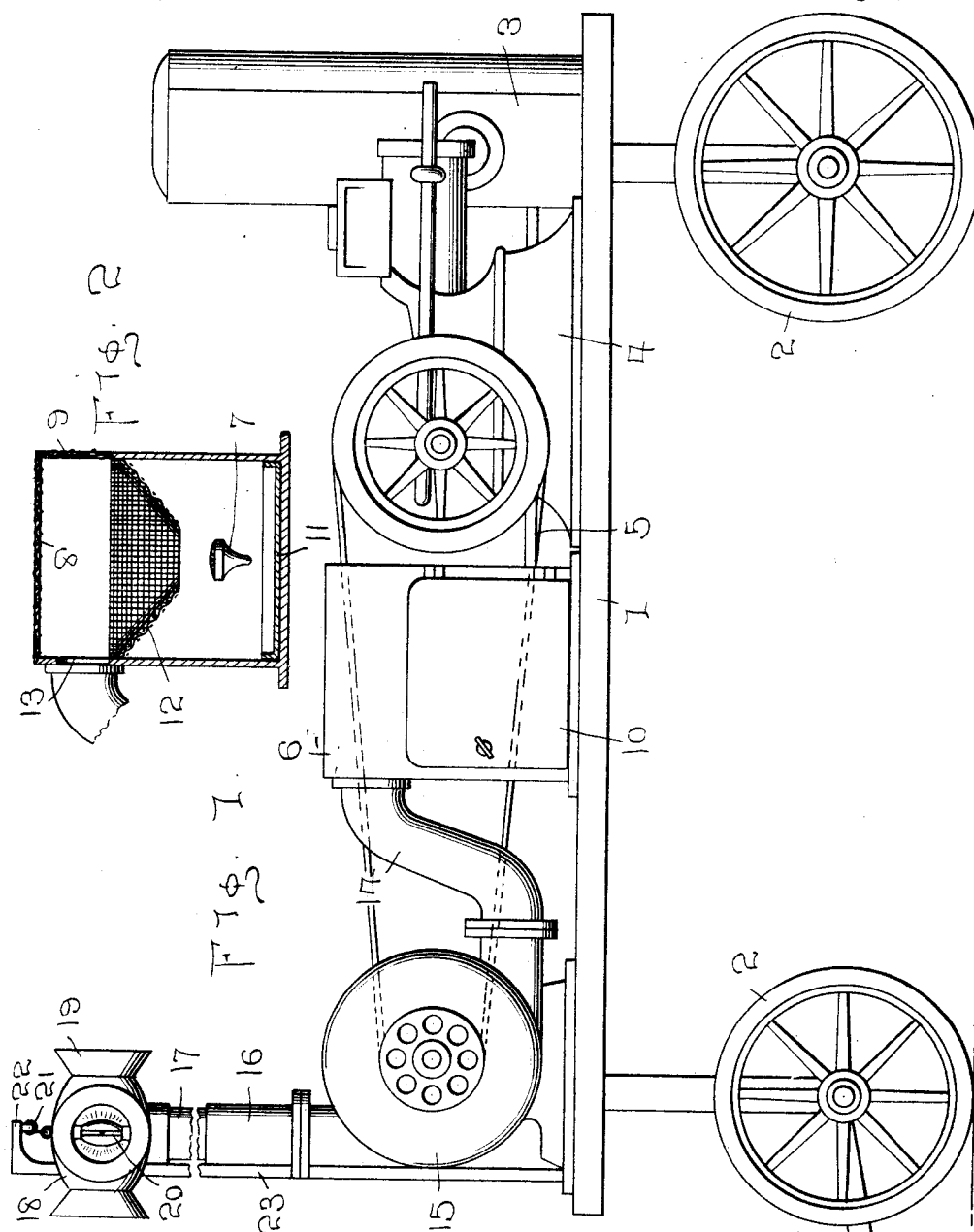

CHARLES VAN PELT HOSELTON, OF CARTERVILLE, MISSOURI.

INSECT-DESTROYER.

1,035,012.   Specification of Letters Patent.   Patented Aug. 6, 1912.

Application filed May 11, 1911.  Serial No. 626,598.

*To all whom it may concern:*

Be it known that I, CHARLES VAN PELT HOSELTON, a citizen of the United States, residing at Carterville, in the county of Jasper and State of Missouri, have invented certain new and useful Improvements in Insect-Destroyers; and I do hereby declare the following to be a full, clear, and exact description of the invention, such as will enable others skilled in the art to which it appertains to make and use the same.

This invention relates to means for destroying insects and has special reference to a machine for attracting, trapping and cremating insects of various kinds which destroy cotton plants, fruits, etc.

An object of the invention is to provide means for attracting insects such as moths, by means of illumination and means for drawing the moth millers thus attracted into a blaze to destroy the nuisances.

Another object is to provide means for creating the above referred to light for attracting the millers and for creating the blaze to destroy the nuisances, and, another object is to provide a machine of the above stated character which will attract millers from all directions and destroy the nuisances automatically.

Other objects and advantages will be hereinafter set forth and pointed out in the specification and claim.

In the accompanying drawings which are a part of this application, Figure 1 is a side elevation of the complete machine, and Fig. 2 is a vertical sectional view through the cremating furnace.

Referring to the drawings in which similar reference numerals represent corresponding parts throughout the several views, 1 indicates the platform which is mounted upon wheels 2 and supports the destroyer. The gasolene supply tank 3 is positioned upon the rear end of the platform 1 and supplies gasolene to the gasolene engine 4, positioned near the tank. The engine 4 may be of any preferred type.

Leading from the supply tank 3 is the gasolene conducting pipe 5, which projects into the cremating furnace 6 and terminates in the burner 7, positioned near the center of the furnace a short distance above the floor thereof. The cremating furnace 7 may be constructed of any suitable material, but preferably has its top 8 and its rear side 9 formed of wire of close mesh, the purpose of which will later appear. The side toward the engine is referred to as the rear side 9 of the furnace.

The furnace 6 is provided with the door 10 on one side, which is equal in dimensions to the greater part of that side. Positioned in the bottom of the furnace 6 is the receiving pan 11, which receives the cremated moths after they have been burned to death by the blaze at the burner 7. This pan may be removed with its contents when the door 10 is in open position. Above the burner 7 is the funnel-shaped wire mesh guide 12, upon which the moths fall and which serves to guide them into the blaze of the burner 7. Above the guide 12 near the top of the cremating furnace 6, is the entrance opening 13 in the front wall of the furnace.

The conducting pipe 14 leading from the suction fan 15 is connected to the front side of the furnace structure at the entrance opening 13 and through this pipe the moths are fanned into the furnace 6, as will be understood. Connected to the opposite side of the casing of the fan 15 is the vertical pipe 16, which has telescoping its upper end the adjustable extension 17 carrying the four-way search light box 18. The box 18 is shown as having four flared openings 19, each having a reflector back of it and a light positioned in front of the reflector, but any number of openings may be provided with a light and reflector for each opening. It will be seen that by this construction the lights may be directed in various directions to attract moth millers from the surrounding space. It is a well known fact that moth millers are attracted by light and will approach the light and fly around and around the same. The fan 15 is operated while the lights are burning and the rays from the same may be seen in all directions, and as the moth millers fly to the light through the openings 19, the suction from the fan 15 will draw them down the pipes 17 and 16 and fan them through the conducting pipe 14 into the top of the cremating oven 6. They will then fall upon the funnel shaped guide 12 and, by means of the latter, be directed into the flame of the burner 7 and be cremated and drop into the receiving pan 11.

The search light box 18 and the lights 20 are supported in adjusted position by means of a rope or chain and pulley 21 suspended from the cross arm 22 of the supporting rod 23, which latter is secured to the platform 1 and extends nearly parallel with the vertical pipes 16 and 17.

As this machine will effectively attract, trap and destroy all nuisances such as moth millers which may be attracted by a light, it will be seen that the employment of the device will serve to protect cotton plants, fruit trees and many like plants and, thus, prevent a great loss to the growers of plants, etc., often destroyed by insects.

The machine may be placed in a cotton field or orchard in the early evening and started in operation and left until the following morning, when its operation may be discontinued, the furnace door swung open and the pan 11 removed with the remains of the insects.

As the destroyer is simple in construction and operation it may be manufactured at an extremely low cost and operated by unskilled persons.

What I claim is:

In a device of the class described, the combination with a portable platform, a suction fan supported by said platform, a furnace upon said platform, and a hollow connection between said fan and said furnace; of a vertical supporting rod secured to said platform, a search-light box having openings in the upper end thereof, lighting means within said box, telescopically adjustable connections between said box and said fan, and means connecting the upper end of said support and said box for holding the latter in adjusted position.

In testimony whereof I have signed my name to this specification in the presence of two subscribing witnesses.

CHARLES VAN PELT HOSELTON.

Witnesses:
 M. E. BERRY,
 C. B. BERRY.